United States Patent [19]

Clark

[11] Patent Number: 5,006,606
[45] Date of Patent: Apr. 9, 1991

[54] TIRE WITH RUBBER TREAD

[75] Inventor: John K. Clark, Copley, Ohio

[73] Assignee: The Goodyear Tire & Rubber Company, Akron, Ohio

[21] Appl. No.: 500,629

[22] Filed: Mar. 28, 1990

[51] Int. Cl.$^5$ ............................ C08L 7/00; C08L 9/00; C08L 9/02
[52] U.S. Cl. .................................. 525/233; 525/236; 525/237; 525/238
[58] Field of Search ................ 525/233, 236, 237, 238

[56] References Cited

U.S. PATENT DOCUMENTS 4,433,107 2/1984 Takeuchi et al. .................. 525/233
4,894,420 1/1990 Scriver ................................ 525/237

Primary Examiner—Allan M. Lieberman
Attorney, Agent, or Firm—Henry C. Young, Jr.

[57] ABSTRACT

A pneumatic tire with tread composed of a sulfur cured rubber comprised of, based on the rubber (A) cis 1,4-polyisoprene; (B) at least one of isoprene/acrylonitrile rubber and butadiene/acrylonitrile rubber and, optionally; (C) at least one additional rubber which includes cis 1,4-polybutadiene characterized in that the cis 1,4-polybutadiene is a primary rubber constituent.

1 Claim, No Drawings

TIRE WITH RUBBER TREAD

FIELD OF INVENTION

This invention relates to tire having treads composed of selected rubber blends. The invention further relates to tires having treads with a balance of viscoelastic properties.

BACKGROUND OF THE INVENTION

Pneumatic rubber passenger and truck tires are composed of elements which conventionally include a tread of a rubber composition. The tread rubber is sometimes desirably compounded to provide a tire with a relatively low rolling resistance with reasonable wear and traction.

Viscoelastic properties of the tread rubber itself are important and basically determinative considerations for its performance, particularly for rolling resistance and skid resistance of the tire.

Although it may be desired to compound the tire's tread composition to reduce the rolling resistance of the tire without substantially degrading the tire's traction features, the tire's traction might be expected to be somewhat sacrificed as may be evidenced by its reduction in wet and dry skid resistance.

Tire treads are often composed of synthetic rubber or blends of synthetic rubber with natural rubber for the purpose of achieving desirable tire tread characteristics such as wear, traction and reduction in rolling resistance. Various synthetic rubbers have been used in the manufacture of tires with such treads including styrene/butadiene copolymers (prepared by emulsion or solution polymerization methods) sometimes referred to as SBR, high cis 1,4-polybutadiene rubber as well as medium and high vinyl (1,2-) polybutadiene rubbers. Sometimes a synthetic cis 1,4-polyisoprene has, at least in part, been substituted for the natural rubber in tire tread compositions.

Although such rubber compositions are taught to provide various benefits, some for tire treads it continues to be desirable to provide a pneumatic tire having a rubber tread having an enhanced rolling resistance and/or treadwear commensurate with reasonable traction qualities.

Viscoelastic properties of the rubber, or rubber blend, itself are important. For low rolling resistance of the tire, a tan. delta optimization for a temperature in the range of about 40° C. to about 60° C. is desired whereas a tan. delta optimization for a temperature range of about −10° C. to about 20° C. is desired for good skid resistance. It is difficult to adjust a rubber blend for a tan. delta optimization substantially simultaneously for both temperature ranges and, thus, for both rolling resistance and skid resistance.

In one aspect, U.S. Pat. No. 4,894,420 discloses a tire with a tread composed of (A) 30–90 parts cis 1,4-polyisoprene rubber; (B) 5–20 parts isoprene/acrylonitrile and/or butadiene/acrylonitrile copolymer rubber; and (C) 0–35 parts of other rubber which can be cis 1,4-polybutadiene rubber. Skid resistance is taught to be enhanced without sacrifice in rolling resistance.

STATEMENT AND PRACTICE OF INVENTION

In accordance with this invention, a pneumatic tire is provided having an outer circumferential tread where said tread is a sulfur cured rubber composition comprised of, based on 100 parts by weight rubber (phr), (A) about 50 to about 70, preferably about 55 to about 70, parts by weight cis 1,4-polybutadiene rubber; (B) about 10 to about 30, preferably about 15 to about 30, parts by weight of at least one synthetic rubber selected from at least one of isoprene/acrylonitrile copolymer and butadiene/acrylonitrile copolymer comprised of from about 20 to about 40 mole percent units derived from acrylonitrile and about 60 to about 80 mole percent units derived from isoprene or butadiene in which the glass transition temperature of the rubber is from about −40° C. to about −5° C.; and (C) about 15 to about 35, weight percent of cis 1,4-polyisoprene rubber.

The term "phr" refers to parts by weight of a respective material per 100 parts by weight rubber.

Preferably the copolymer (B) is a random copolymer prepared by emulsion copolymerization.

Conspicuously, a major portion of the rubber component of the tread is cis 1,4-polybutadiene. This is important to enhance tire tread abrasion properties (treadwear).

In the description of this invention, the term cis 1,4-polyisoprene rubber is intended to include both natural and synthetic rubber. Often, the natural rubber is preferred. The cis 1,4-polyisoprene rubber, natural or synthetic, typically has a cis 1,4-content of about 96 to about 99 weight percent.

For the isoprene/acrylonitrile and/or butadiene/acrylonitrile rubber component of the composition, the isoprene/acrylonitrile rubber is preferred. However, both rubbers are well known to those having skill in the art.

The cis 1,4-polybutadiene rubber can be composed of 95% or more of cis 1,4 structure when prepared with Ziegler-type catalyst or can be composed of at least 90% cis and trans 1,4 structure when prepared with alkyl lithium catalyst. Both types of rubbers are well known.

A preferred embodiment of the invention, particularly for tires to be used for somewhat conventional loads and speeds such as passenger vehicle tires or light truck tires, although the embodiment is not necessarily limited to such use, is a pneumatic tire provided with such tread where said tread is a sulfur cured rubber composition comprised of, based on 100 parts by weight rubber (phr), (A) about 55 to about 70 phr cis 1,4-polybutadiene rubber; (B) about 15 to about 30 phr of said isoprene/acrylonitrile rubber; and (C) about 15 to about 35 phr of natural rubber.

The pneumatic tires are conventionally comprised of a generally toroidal shaped carcass with an outer circumferential tread, adapted to be ground contacting, spaced beads and sidewalls extending radially from and connecting said tread to said beads.

The rubbers used herein, particularly those in the higher ML-4 (Mooney) viscosity range, can optionally be individually oil extended before or during mixing with various rubber compounding materials for ease of processing. If oil extension is used, usually about 10 to about 50 phr of rubber processing oil is used, usually of the aromatic or aromatic/paraffinic oil type, to provide a ML-4 (100° C.) viscosity of about 40–100, preferably about 60 to about 90, for the uncured rubber composition.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various constituent rubbers with various materials such, as for example, curing aids, such as sulfur and accelerators, processing additives, such as oils, resins, silicas, and plasticizers, fillers, pigments, antioxidants and antiozonants and reinforcing materials such as, for example, carbon black.

The tire can be built, shaped, molded and cured by various methods which will be readily apparent to those having skill in the art.

In the practice of this invention, the polymer blend-tread can be integral with and adhered to (sulfur co-cured with) various tire carcass substrate rubber compositions. Typically, such a rubber composition is, for example, at least one of a butadiene/styrene copolymer rubber, cis 1,4-polyisoprene (natural or synthetic rubber) and 1,4-polybutadiene.

In the further practice of this invention, the tread can typically be applied in the building of the green tire in which the uncured, shaped tread is built onto the carcass following which the green tire is shaped and cured.

Alternatively, the tread can be applied to a cured tire carcass from which the previous tread has been buffed or abraded away and the tread cured thereon as a retread.

In the practice of this invention, the acrylonitrile copolymer rubber is a particularly desirable and required feature of the rubber tread. The precise structure of such rubber itself may not be entirely understood, although the acrylonitrile units in the rubber can be random, block or tapered. It has been observed that its inclusion in the rubber blend of a tire tread has provided a tire with enhanced characteristics as a desirable combination of rolling resistance, skid resistance and treadwear.

The isoprene/acrylonitrile rubber can be more fully described as a random emulsion polymerization prepared copolymer.

While the contribution of various elements or components of a composition are not always completely understood, it is believed an important and significant component of the blend is the isoprene/acrylonitrile rubber and butadiene/acrylonitrile rubber which apparently provides unique viscoelastic properties with the remainder of the rubber(s).

It has been observed that tires with tread of this invention have provided an enhanced treadwear while maintaining good traction. The substantially higher concentration of cis 1,4-polybutadiene rubber as a main and major rubber constituent has, therefore, been observed to provide a tread for a pneumatic rubber tire which differentiates it from the tread composition disclosed in the aforesaid U.S. Pat. No. 4,894,420.

The practice of this invention is further illustrated by reference to the following examples which are intended to be representative rather than restrictive of the scope of the invention. Unless otherwise indicated, all parts and percentages are by weight.

EXAMPLE I

A rubber composition composed of blends of cis 1,4-butadiene rubber, isoprene/acrylonitrile copolymer (IAR), having an isoprene/acrylonitrile ratio of about 70/30, and natural rubber (identified herein as Compound X) was comprised of the recipe shown in Table 1.

TABLE 1

| Material | Parts (Rounded Values) Compound X |
| --- | --- |
| Natural Rubber | 20 |
| Cis 1,4-Polybutadiene Rubber | 55 |
| IAR (70/30) | 25 |
| Processing Oil | 15 |
| Antidegradant | 3 |
| Stearic Acid | 2 |
| Carbon black/silica (35/15 ratio) | 50 |
| Zinc Oxide | 3 |
| Sulfur | 2 |
| Accelerator(s) | 2 |

TABLE 2

| Property[1] | Compound X |
| --- | --- |
| Hot Rebound | 70 |
| Cold Rebound | 39 |
| Hardness (25° C.) | 70 |
| Strebler Adhesion (Tear) "With Itself" (Newtons) | 92 |
| Tensile (MPa) | 17 |
| Tan. delta (0°) | .536 |
| Tan. delta (60°) by Rheometrics Tester | .162 |

[1]Properties determined by conventional rubber procedures.

EXAMPLE II

Pneumatic tires of conventional construction (grooved tread, sidewalls, spaced beads, and supporting fabric-reinforced carcass) were built, shaped and cured in a conventional tire mold. The tread was built onto the uncured carcass as a pre-extruded element. The tires were of the P235/75R15 passenger tire construction and identified herein as tire YY.

Experimental tire YY had a tread cap composed of Compound X of Example 1.

The tire was mounted on a rim, inflated and submitted to testing. The test values were normalized to a value of 100 for representative evaluation purposes comparative to a more conventional similar tire without the isoprene/acrylonitrile rubber in its tread.

The tire YY with the Composition X for its tread cap showed an improved treadwear while providing good skid resistance.

Table 3 illustrates the average treadwear and wet skid resistance values with the Experimental Tire YY compared to values of the more conventional tire normalized to 100.

TABLE 3

| Measured Values[1] | Tire YY |
| --- | --- |
| Skid Resistance | 96–99 |
| Treadwear | 113 (improved) |

[1]Measured by conventional tire test procedure.

The skid resistance was a standard test in which the tires are mounted on opposite sides of a weighted, drawn trailer at various speeds and brakes of the trailer applied and skid force (peak and slide) measured.

For treadwear, the tires were mounted on rims, inflated and the resulting tire/rim assemblies placed on vehicles and the vehicles run with the depth of the tread grooves being periodically measured and compared to a conventional tire of similar size and construction. The test tires demonstrated an average comparative value of 113.

In this Example, the isoprene/acrylonitrile rubber is prepared by emulsion polymerizing isoprene and acrylonitrile. It is considered to be a random copolymer. The butadiene/acrylonitrile rubber is prepared similarly and is expected to produce similar results.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer circumferential tread where said tread is a sulfur cured rubber composition comprised of, based on 100 parts by weight rubber (phr), (A) about 55 to about 70 parts by weight cis 1,4-polybutadiene rubber; (B) about 15 to about 30 parts by weight of isoprene/acrylonitrile copolymer rubber comprised of from about 20 to about 40 mole percent units derived from acrylonitrile and about 60 to about 80 mole percent units derived from isoprene in which the glass transition temperature of the rubber is from about $-40°$ C. to about $-5°$ C.; and (C) about 15 to about 35 parts by weight of cis 1,4-polyisoprene rubber.

* * * * *